United States Patent [19]
Kellum et al.

[11] 4,123,601
[45] Oct. 31, 1978

[54] CATALYST FEEDING APPARATUS

[75] Inventors: Gene E. Kellum; Jack W. Thompson, both of Orange, Tex.

[73] Assignee: Gulf Oil Corporation, Pittsburgh, Pa.

[21] Appl. No.: 789,051

[22] Filed: Apr. 20, 1977

[51] Int. Cl.² .......................... B01J 8/00; C08F 2/00; C08F 4/00
[52] U.S. Cl. ...................................... 526/79; 526/86; 422/234
[58] Field of Search ................. 526/79, 86; 23/288 E, 23/288 R

[56] References Cited

U.S. PATENT DOCUMENTS

| | | | |
|---|---|---|---|
| 3,012,024 | 12/1961 | Kavesh | 526/86 |
| 3,257,363 | 6/1966 | Miller et al. | 526/86 |
| 3,790,550 | 2/1974 | Miller | 526/79 |
| 3,846,394 | 11/1974 | Mitacek | 526/79 |
| 3,876,602 | 4/1975 | Calvert et al. | 526/86 |

*Primary Examiner*—Alan Holler
*Attorney, Agent, or Firm*—Richard L. Kelly

[57] ABSTRACT

Apparatus is provided to feed controlled quantities of a catalyst slurry to an olefin polymerization reactor in a controlled time sequence. The apparatus includes a feed line for continuously feeding an inert hydrocarbon liquid such as hexane or isobutane to the reactor. A bypass loop is provided in the feed line and is equipped with auxiliary apparatus to charge the loop with a predetermined quantity of catalyst slurry. At preselected timed intervals, the hydrocarbon feed is fed through the bypass loop to sweep the charge of catalyst slurry to the polymerization reactor.

4 Claims, 2 Drawing Figures

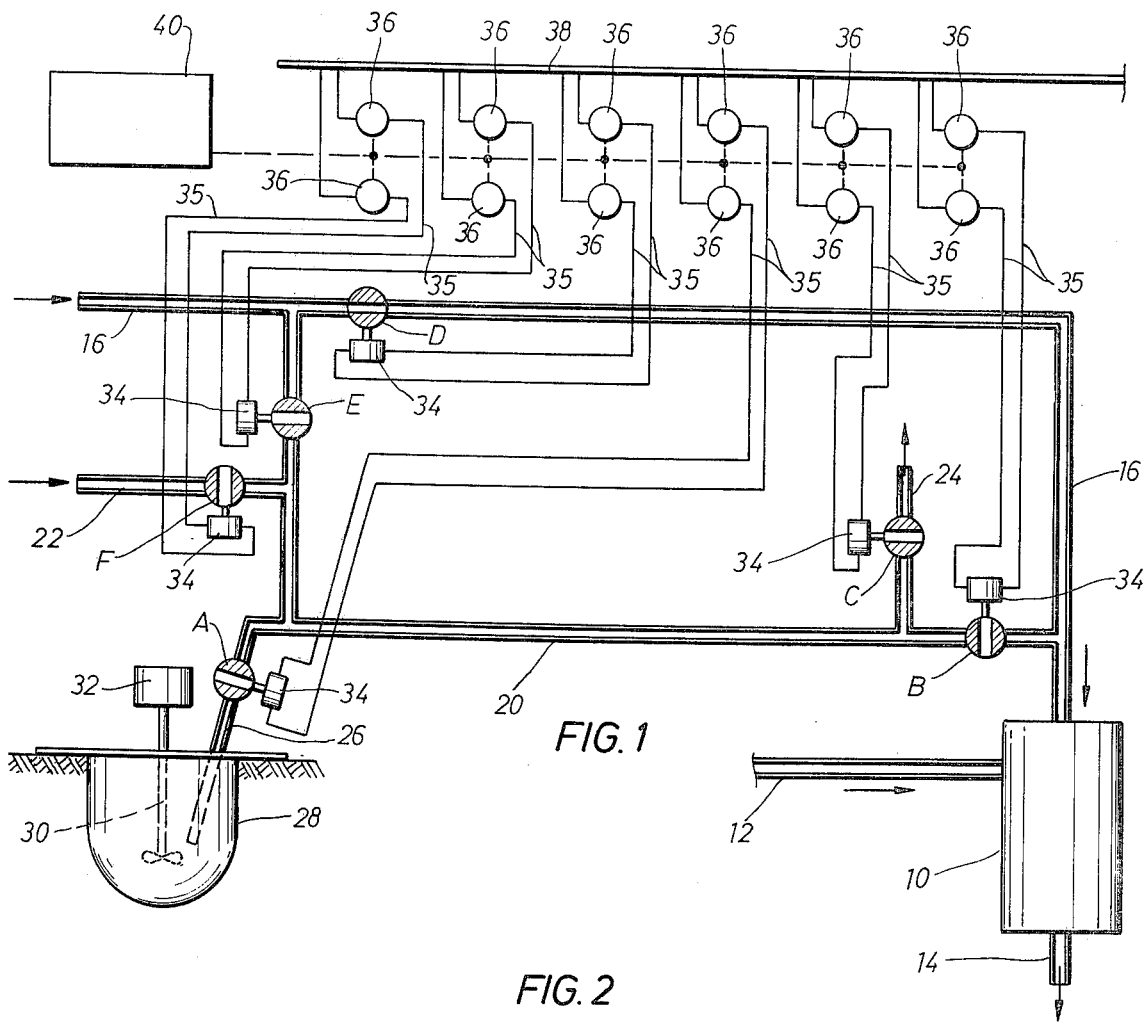

CATALYST FEEDING APPARATUS

BACKGROUND OF THE INVENTION

A number of processes for the polymerization of monoolefins such as ethylene and propylene are run on a continuous basis with monomers and catalyst being fed to the reaction zone on an essentially-continuous basis with polymerization products being withdrawn from the reactor at essentially the same rate as monomer is charged to the reactor. In many of such olefin polymerization processes the catalyst employed is a finely-divided solid such as chromia supported on silica, or a catalyst prepared by reducing a transition metal compound such as $TiCl_3$ with an aluminum alkyl. Such catalyst solids are conventionally suspended or slurried in a liquid hydrocarbon for feed to the polymerization reactor.

From theoretical considerations, it would be desirable to feed such a catalyst slurry to the polymerization reactor on a truly continuous basis. The rate of catalyst consumption in such reactions, howver, is sufficiently low that it is extremely difficult to feed such small quantities of catalysts to the reactor at steady rates. Accordingly, a standard practice has developed in which larger quantities of the catalyst are fed to the reactor at periodic intervals.

By reason of the fact that the catalyst is fed to the reactor as a slurry of finely-divided solids in an inert hydrocarbon liquid, problems are encountered in feeding substantially identical quantities of the catalyst solids to the reactor. This results from the fact that it is difficult to maintain the catalyst solids uniformly slurried throughout the hydrocarbon liquid, particularly during the time interval in which the catalyst slurry is being fed from the catalyst slurry holding tank to the polymerization reactor.

Numerous types of equipment and processes have been suggested to obtain equal quantities of catalyst solids in each lot of catalyst slurry that is periodically fed to the polymerization reactor. To date, however, none of the proposed systems operates as efficiently as desired. It is observed in actual practice that the quantity of catalyst solids fed to the reactor varies from charge to charge. For this reason, there is a need in the art for improved apparatus and methods to feed more uniform quantities of catalyst solids to olefin polymerizations.

BRIEF DESCRIPTION OF DRAWINGS

FIG. 1 illustrates apparatus for feeding precisely controlled quantities of catalyst slurry to a polymerization reactor.

FIG. 2 illustrates the sequence of opening and closing the series of six valves included in the apparatus of FIG. 1 as this system operates through one cycle of feeding a measured quantity of catalyst slurry to an olefin polymerization reactor.

SUMMARY OF THE INVENTION

The applicants have provided apparatus for feeding controlled quantities of a slurry of catalyst solids in a liquid hydrocarbon medium to a polymerization reactor in a controlled, timed sequence. The apparatus includes a main feed line which throughout most of a cycle feeds an inert hydrocarbon such as hexane to the polymerization reactor. A bypass line is provided which constitutes a loop in the main hydrocarbon feed line. The loop has a fixed volume and includes a hydrocarbon feed line, a vent line, a reservoir of catalyst slurry, and a series of valves so that the loop can be filled with catalyst slurry while hydrocarbon is being fed to the reactor through the main feed line. At preselected times, the hydrocarbon being fed to the reactor is fed through the loop to sweep the precisely-controlled quantity of catalyst slurry into the polymerization reactor.

DETAILED DESCRIPTION OF THE INVENTION

The apparatus illustrated in FIG. 1 includes a polymerization reactor 10, a line 12 for feeding monomer to reactor 10, and a line 14 for removing polymerization products. A line 16 is provided which alternately feeds an inert hydrocarbon such as hexane and catalyst slurry to reactor 10. Line 16 is continuously maintained under a pressure in excess of the pressure prevailing in reactor 10 to prevent any back flow of products from reactor 10 into line 16. A bypass line 20 is provided in and constitutes a loop in line 16. A series of three valves D, E, and B are provided so that the hydrocarbon being fed to reactor 10 through line 16 can be fed directly and entirely through line 16 or through the bypass loop 20. As illustrated in FIG. 1, valve D is open and valves E and B are closed so that only hydrocarbon is being fed to the reactor.

In addition to the valves E and B previously discussed, loop 20 includes certain auxiliary elements so that it can be filled with a catalyst slurry while hydrocarbon is being fed to reactor 10 through line 16. Included in such auxiliary elements is a feed line 22 containing a valve F therein and a vent line 24 having a valve C therein. Teed to loop 20 is a line 26 having a valve A therein. One end of line 26 dips into catalyst slurry tank 28 which includes a stirrer 30 driven by motors 32.

Each of valves A, B, C, D, E, and F is open or closed by a pneumatic valve actuator 34. The pneumatic valve actuators open or close in response to compressed air delivered through lines 35 from compressed air signal elements 36. The compressed air signal elements 36 are connected to a compressed air supply line 38 and are actuated by solenoid valves (not shown). The solenoid valves open and close in response to signals received from micro switches (not shown). The micro switches are tripped by a series of cams attached to a motor shaft driven by a timing motor, this arrangement being conventional and not shown in detail but contained in an electrical junction box 40. A catalyst actuator (not shown) containing a series of micro switches turns the timing motor off following completion of its cycle. The actuator then turns the timing motor on again following a preselected time interval from the ending of the previous cycle.

The operation of the apparatus through one full cycle will be described by reference to FIGS. 1 and 2, with FIG. 2 illustrating the positions of the various valves (either opened or closed) at various steps in the cycle. FIG. 1 depicts the operation of the apparatus in step 1 of the cycle in which valve D is open and all of the other valves are closed. In this step in the cycle a hydrocarbon such as hexane is fed through line 16 into the reactor. During this step of the cycle, the hexane functions to keep line 16 fluid full and to prevent any back flow of reactants from reactor 10 into line 16.

In step 2 of the cycle, valve D is closed and valves E and B are opened. In this step of the cycle, hexane flows through loop 20 and flushes the fixed quantity of catalyst slurry in loop 20 into reactor 10. The apparatus is maintained in the mode of step 2 for a time sufficient to pass sufficient hexane through loop 20 to flush essentially all of the catalyst slurry into reactor 10. It is preferred practice to feed the hexane through line 20 in a volume equal to at least 5 and preferably at least 20 times the volume of loop 20.

In step 3 of the cycle, valve D is opened and valves E and B are closed. Thereafter, valve D is maintained in an opened position throughout the remaining steps of the cycle so that hexane is continuously fed through line 16 to the reactor while the subsequently-described operations are being carried out in the loop.

In step 4 of the cycle, valves C and F are opened and a low boiling hydrocarbon such as isobutane fills the section of loop 20 defined by valves E, F, A, B, and C. The isobutane fed to the loop will be maintained under substantially the same superatmospheric pressures as the hexane being fed through line 16. Isobutane is vented from loop 20 through valve C and this action serves to sweep any small residium of catalyst slurry from the loop. As relatively small quantities of isobutane are vented through valve C, it normally will be fed to a flare although, if desired, it could be recycled.

In step 5 of the cycle, valves F and C are closed so isobutane is trapped in the section of the loop defined by valves E, F, A, B, and C. As previously noted, the isobutane will be under superatmospheric pressure.

In step 6 of the cycle, valve A is opened and isobutane from the loop flows into catalyst slurry tank 28. After the pressure is equalized, valve A is closed.

In step 7 of the cycle, valve C is opened to vent the isobutane remaining in the loop and to reduce the pressure in the loop to atmospheric pressure.

In step 8 of the cycle, valve A is opened. Since the catalyst slurry tank 28 is under a pressure in excess of atmospheric pressure, the pressure within tank 28 forces catalyst slurry through line 26 into loop 20 with a small quantity of the catalyst slurry being vented through valve C. Optionally gas pressure from third line not shown may be applied to the interior of tank 28 to assist in transferring the catalyst slurry from tank 28 to the loop.

In step 9 of the cycle, valve A and valve C are closed and loop 20 is filled with catalyst slurry. This ends one complete cycle. It will be noted that the positions of the valves A-F, inc., in step 9 are identical to the positions of the valves in step 1 of the cycle.

From the above descriptions, it is apparent that apparatus of the invention has great flexibility and can be readily adjusted to feed a wide variety of catalyst slurries to diverse types of polymerizations. While loop 20 as illustrated in FIG. 1 has a fixed volume, an additional valve or a plurality of additional valves can be inserted between valve E and the angle bend in loop 20. By opening and closing such intermediate valves, the effective volume of the loop and the quantity of catalyst solids fed to the reactor per cycle can be changed. The quantity of catalyst solids fed to the reactor per cycle also can be adjusted by adjusting the concentration of catalyst solids suspended in the catalyst slurry fed to the loop.

In addition to the adjustments in the quantity of catalyst solids fed to the reactor per cycle as set forth in the paragraph above, the time interval between cycles can be varied widely by simple adjustments in the catalyst actuator which controls the time intervals between cycles. Typically, the time intervals between the ending of one cycle and the beginning of the next cycle will be varied between five seconds and ten minutes. The time required to complete one cycle can be varied somewhat, but typically a period of 25 to 35 seconds is employed.

Another major advantage of the apparatus of the invention is that it can be readily adapted and/or modified to feed diverse types of catalyst slurries to the polymerization reactor. This results principally from the fact that the catalyst slurry is flushed from the loop into the reactor by fluid flow under positive pressure, rather than depending upon gravity feed. As a consequence, the apparatus is capable of feeding catalyst solids of virtually any bulk density to the reactor.

What is claimed is:

1. Apparatus for feeding controlled quantities of a slurry of catalyst solids in a liquid medium to a reactor in a controlled time sequence consisting essentially of:
   a. a reactor,
   b. a fluid line to feed a liquid to said reactor,
   c. a bypass line which connects to two parts of said fluid line and constitutes loop in said fluid line,
   d. a first valve in said fluid line intermediate of the loop ports,
   e. a second valve positioned in said loop near its inlet port,
   f. a third valve positioned in said loop near its outlet port,
   g. a fourth valve positioned in said loop intermediate of said second and third valves to feed a liquid to said loop,
   h. a fifth valve positioned in said loop intermediate of said second and third valves to vent fluid from said loop,
   i. a liquid reservoir adapted to contain a slurry of catalyst solids in a liquid medium and
   j. a feed line connecting said liquid reservoir to said loop and having a sixth valve therein.

2. Apparatus of claim 1 including control means to carry out, in a repeating timed sequence, the following steps:
   a. opening the fourth and fifth valves,
   b. closing the fourth and fifth valves,
   c. opening the sixth valve,
   d. closing the sixth valve,
   e. opening the fifth and sixth valves,
   f. closing the fifth and sixth valves,
   g. closing the first valve,
   h. opening the second and third valve,
   i. closing the second and third valve, and
   j. opening the first valve.

3. Apparatus of claim 2 including second control means for varying the time interval between step (j) of one cycle and step (a) of the next cycle.

4. A process for feeding controlled quantities of a slurry of catalyst solids in a liquid medium to a polymerization reactor which consists essentially of the sequential steps of:
   a. feeding an inert hydrocarbon through a feed line into the reactor,
   b. filling a bypass loop in the feed line with a slurry of catalyst solids in a liquid medium,
   c. feeding hydrocarbon from the feed line through the loop to flush the catalyst slurry in the bypass loop into the reactor,
   d. stopping the feed of hydrocarbon through the bypass loop,
   e. resuming feed of the inert hydrocarbon through the feed line into the reactor, and
   f. continuously repeating steps (a), (b), (c), (d), and (e).

* * * * *